US009585199B2

(12) United States Patent
Chyou et al.

(10) Patent No.: US 9,585,199 B2
(45) Date of Patent: Feb. 28, 2017

(54) HYBRID HEATING APPARATUS APPLICABLE TO THE MOVING GRANULAR BED FILTER

(71) Applicant: ATOMIC ENERGY COUNCIL—INSTITUTE OF NUCLEAR ENERGY RESEARCH, Taoyuan County (TW)

(72) Inventors: Yau-Pin Chyou, Taoyuan County (TW); Yi-Shun Chen, Taoyuan County (TW); Shu-Che Li, Taoyuan County (TW); Po-Chuang Chen, Taoyuan County (TW)

(73) Assignee: Atomic Energy Council—Institute of Nuclear Energy Research, Taoyuan County (TW)

( * ) Notice: Subject to any disclaimer, the term of this patent is extended or adjusted under 35 U.S.C. 154(b) by 631 days.

(21) Appl. No.: 14/066,880

(22) Filed: Oct. 30, 2013

(65) Prior Publication Data

US 2015/0117845 A1 Apr. 30, 2015

(51) Int. Cl.
*A47J 27/00* (2006.01)
*H05B 3/42* (2006.01)

(52) U.S. Cl.
CPC .................................... *H05B 3/42* (2013.01)

(58) Field of Classification Search
None
See application file for complete search history.

(56) References Cited

U.S. PATENT DOCUMENTS 4,096,909 A * 6/1978 Jukkola .................. B01J 8/1836 122/4 D
4,214,576 A * 7/1980 Henley .................. A61H 33/04 601/16
4,338,887 A * 7/1982 Leon ....................... F23C 10/14 110/245
4,476,098 A * 10/1984 Nakamori ................ B01J 8/006 422/140
4,498,462 A * 2/1985 Henley .................. A61H 33/04 601/16
5,620,521 A * 4/1997 Tachikawa ................. B01J 8/32 118/407

(Continued)

FOREIGN PATENT DOCUMENTS

TW M302002 12/2006

*Primary Examiner* — Thor Campbell
(74) *Attorney, Agent, or Firm* — Rosenberg, Klein & Lee

(57) ABSTRACT

A structure of hybrid heating equipment according to the present invention is disclosed. The present invention combines a multiple of the thermal sources for heating the interior materials of the container simultaneously, and assures the materials could gain the thermal energy uniformity. Furthermore, the present invention allows users to control the level of the heating simply through adjusting the length of interior heating elements or the flow rate of the incoming gas. In addition, the present invention connect with the tubes of the hot exhaust gas to further lower the influence of the thermal resistance by coordinating the flow of the hot exhaust gas, therefore fully reflect the advantages of the conserving energy and reducing the carbon emissions by reusing the waste heat as the principal source while the electric heating devices as supplement.

11 Claims, 5 Drawing Sheets

(56) References Cited

U.S. PATENT DOCUMENTS

| | | | | | |
|---|---|---|---|---|---|
| 6,069,012 | A * | 5/2000 | Kayser | B01J 8/0015 | 422/130 |
| 7,771,687 | B2 * | 8/2010 | Kim | C01B 33/027 | 422/139 |
| 8,377,208 | B2 * | 2/2013 | Jung | B01J 19/2415 | 118/716 |
| 8,580,203 | B2 * | 11/2013 | Jung | B01J 8/1836 | 422/129 |
| 9,023,425 | B2 * | 5/2015 | Osborne | C23C 16/24 | 118/308 |
| 9,156,705 | B2 * | 10/2015 | Bhusarapu | C01B 33/03 | |
| 2009/0047204 | A1 * | 2/2009 | Kim | C01B 33/027 | 423/349 |
| 2011/0306187 | A1 * | 12/2011 | Dold | C01B 33/037 | 438/478 |

* cited by examiner

HYBRID HEATING APPARATUS APPLICABLE TO THE MOVING GRANULAR BED FILTER

FIELD OF THE INVENTION

The present invention relates to a heating apparatus, which is applicable to the moving granular bed filter, and to the hybrid heating apparatus used to heat a target concurrently and uniformly by multiple heat sources including not only direct contact but also led-in high-temperature exhaust gas for reducing the total thermal resistance.

BACKGROUND OF THE INVENTION

At present, most heating apparatuses supply a single type heat source to heat the tanks. Popular configurations include disposing devices such as heat sources, quartz tubes or electrical heating plate below the heating tanks. By burning fuels directly or converting electrical energy to thermal energy, the heat is transferred indirectly via the tank bodies of the heating tanks to the materials inside.

In this heating mode, the material closest to the bottom of the heating tank receives the thermal energy first and the temperature is gradually increased earlier than others. If the materials are in liquid state during the heating process, it is possible to transfer the heat through convection, thus the temperature of the overall materials can be increased more uniformly.

Nonetheless, liquid material with a high viscosity would hinder convection in the heating process. Consequently, the thermal energy provided by the heat sources may concentrate excessively in the region close to the bottom of the heating tanks and lead to nonuniform heating. Some materials may deteriorate due to overheating caused by heat retention.

When the heated materials are granular materials the contact areas among granules are small and nonuniform, resulting in increased thermal resistance (R), which becomes a great obstacle for heat transfer. The thermal resistance is defined as $\Delta T/q$ (° C./W or K/W), where $\Delta T(=T_i-T_o)$ is the temperature difference between two contact surfaces and q is the thermal transfer energy. Here, the thermal resistance $R_t$ of the whole system includes the conduction part $R_{cd}$ and the convection one $R_{cv}$. The conduction thermal resistance $R_{cd}$ represents the resistant effect when heat is transferred by conduction. Taking heat transfer through filter granules as an example, the conduction thermal resistance is defined as $\Delta x/(kA)$, where $\Delta x$ is the thickness or distance of the thermal conductor, k is the thermal conductivity, and A is the thermal conduction area in-between. In addition to the interfaces of real contacts between granules, there are gaps without contacts, where gas flows through and results in extra thermal resistance $R_t$. The thermal resistance $R_t$, defined as $1/(hA)$, is caused by convection between the solid surfaces and fluids, where h is the heat transfer coefficient and A is the heat transfer surface area.

The conduction thermal resistance $R_{cd}$ and the convection thermal resistance $R_{cv}$ mentioned above cause obstacles to heat transfer; hence, the influence of the thermal resistances should be eased off in order to improve the heating efficiency. Possible options include improving the structural design of the heating tanks, stirring the granular materials by external work, leading in external hot gas, or changing the form of heat sources.

A method for solving the problems described above is to stir the granular materials by external force. This stirring action is to move the heated granules that are closer to the heat sources to the region with lower temperature, which does not rely on the existing heat transfer paths only. In addition, through stirring the granules with higher temperature can contact those not nearby initially, and thus shorten the heat transfer paths. In other words, the stirring action can mainly reduce the overall system conduction thermal resistance $R_{cd}$. During the stirring process, the gas flow among the granules can be driven and thereby slightly reduces the convection thermal resistance $R_{cv}$ to improve the uniformity of the overall heat transfer. Nonetheless, in practice it is not easy to heat the granular materials close to the top as uniformly as those close to the bottom by simply stirring. Only the spin motion of the whole heating tank can provide sufficient stir. Unfortunately, spin motion is not a commonly available system, and is therefore not applicable to most cases; moreover, its installation and operation costs will raise financial barriers.

Another method is to change the type of the heat sources. For example, the heat source can be made in the type of serpentine tubes, which thus improves the range and region of heat supply. Nonetheless, in industrial heating tanks, even if the serpentine quartz heating tubes are adopted or the tubes filled with high-temperature liquid or gas are being used in the inner walls of said heating tanks, there is still room for improvement for supplying heat to the central part of the heating tanks.

Taiwan Patent Publication Number TW M302002 disclosed a baking apparatus combining two heat sources for baking materials. The appearance of the apparatus is a kiln. Inside the apparatus, the hot gas is led in from the bottom, guided upwards, and passes through a vent for heating. Meanwhile, there are multiple heating platforms disposed therein and heated by electric heaters. Nonetheless, such apparatus combining dual heat sources is only applicable to place a plurality of standalone items. There is no contact between the standalone items for heat conduction. Instead, they are arranged on the electric heaters for heating and baking; hence, the application range is quite limited, and the inner space is not utilized effectively, where materials are not fully filled for uniform heating. Accordingly, a real hybrid heating apparatus still awaits new technology for implementation.

In order to solve current technology problems, the present invention proposes a novel design of structure and method. Considering that the thermal resistance of a system comprises the conduction thermal resistance $R_{cd}$ and the convection thermal resistance $R_{cv}$, the structure of the heating tank is improved and changed, and so that different methods are used for reducing the obstacles in the heat transfer caused by said factors. For the part of the conduction thermal resistance $R_{cd}$, according to the present invention, multiple sets of heating bars are inserted into the heating tank concurrently for controlling their distribution and thus reducing the conduction thermal resistance $R_{cd}$ by enabling the heat to be conducted uniformly in the heating tank. For the problem of the convection thermal resistance $R_{cv}$, pipes are disposed for leading hot gas having sufficient thermal energy into the tank for reducing the convection thermal resistance $R_{cv}$. By applying both simultaneously, the total thermal resistance $R_t$ of the system is lowered and the thermal efficiency is enhanced. Accordingly, the long-term problem of operation in the heating process of the industry is solved.

SUMMARY

An objective of the present invention is to provide a hybrid heating apparatus, which uses the different heat sources and acquires the thermal energy from both inside and outside of a tank concurrently. In addition, the apparatus according to the present invention is a hybrid system combining the exhaust-gas heating and the electric heating. The present invention does not apply only a single type or form of heating unit; it is neither limited to a single direction heating nor heating the tank only. Instead, the apparatus according to the present invention adopts the advantages of various heating units and heats the materials inside the tank uniformly.

Another objective of the present invention is to provide a hybrid heating apparatus, which inserts the electric heating bars into the tank for supplying the heat sources thereto. Those electric heating bars can be arranged to make the temperature distribution in the system more uniform based on the fact that the heat is not supplied from the periphery only. Moreover, users can adjust the geometrical arrangement depending on the situation, facilitating the flexibility of the system.

Still another objective of the present invention is to provide a hybrid heating apparatus. In addition to using the direct-contact electric heating bars, the heated gas is also used and flows upwards from the bottom of the tank. This high-temperature gas can flow in the gaps among the heated granular materials and thus further improving the heating uniformity of the system. Compared with the case in which the gas without flowing, the flow phenomenon of the heated gas enhanced the convection, which reduces the convection thermal resistance $R_{cv}$. Thereby, the total thermal resistance $R_t$ of the system is lowered and the heat transfer effect is increased. Besides, by combining the present invention with other apparatuses or systems, their exhaust gas and waste heat and can recycled and hence reducing power consumption and promoting environmental protection.

A further objective of the present invention is to provide a hybrid heating apparatus, which adopts the hot exhaust gas as the main heating source and the electrical heating system as the auxiliary one. In other words, the low power consumption is the core of the present technology. The exhaust gas that is discharged at will and wasted originally is reused as much as possible. By incorporating the electric heating system concurrently, the heating effect will be more uniform, endowing the present invention with utility as well as saving energy and controlling carbon emission. In addition, when the present invention leads in the hot exhaust gas via the exhaust heat pipe using the gas extractor, the consumed power is far smaller than the power required for heating the gas by combustion. It is reasonable that affirming the present invention truly benefits recycling.

For achieving the objectives described above, the present invention consists of a hybrid heating apparatus, which comprises a tank, a lid, at least an inner heating unit, and a gas distributor. The tank has a storage space inside and has a top opening part and a bottom opening part on its top and bottom ends. The lid is disposed on the top opening part with several holes on its surface. The inner heating units insert downwards through the holes and enter the storage space. The gas distributor is located at the bottom opening part. After the hot exhaust gas flows into a plurality of vents from the bottom, a heated gas is led upwards and uniformly to the storage space. According to the structure, after the materials to be heated is filled in the storage space, the hybrid heating apparatus according to the present invention enables an excellent heating effect quickly and uniformly under the power-saving mechanism by the interactions of a multitude of heat sources.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
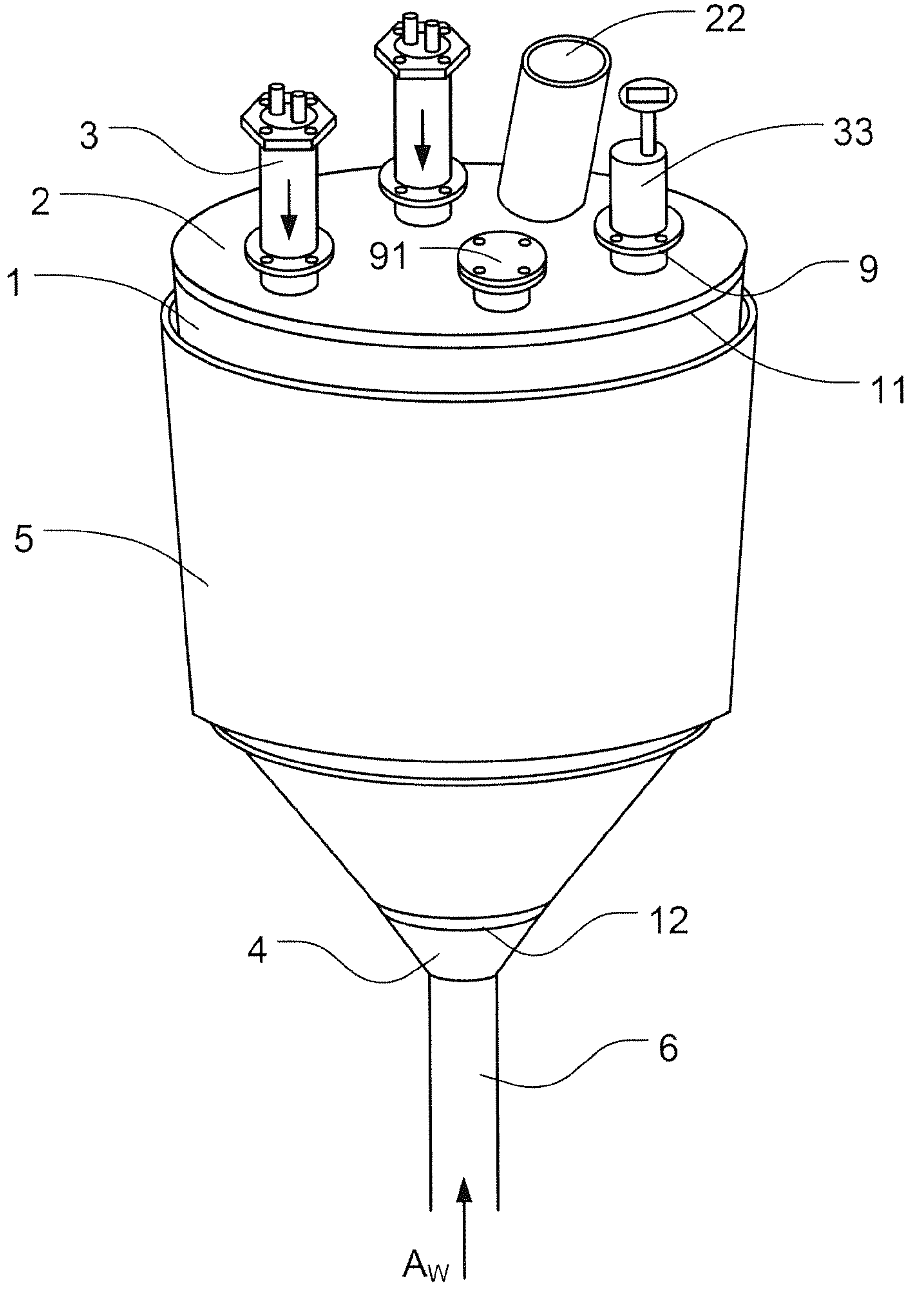
FIG. 1 shows a structural schematic diagram according to the present invention.
Figure 2:
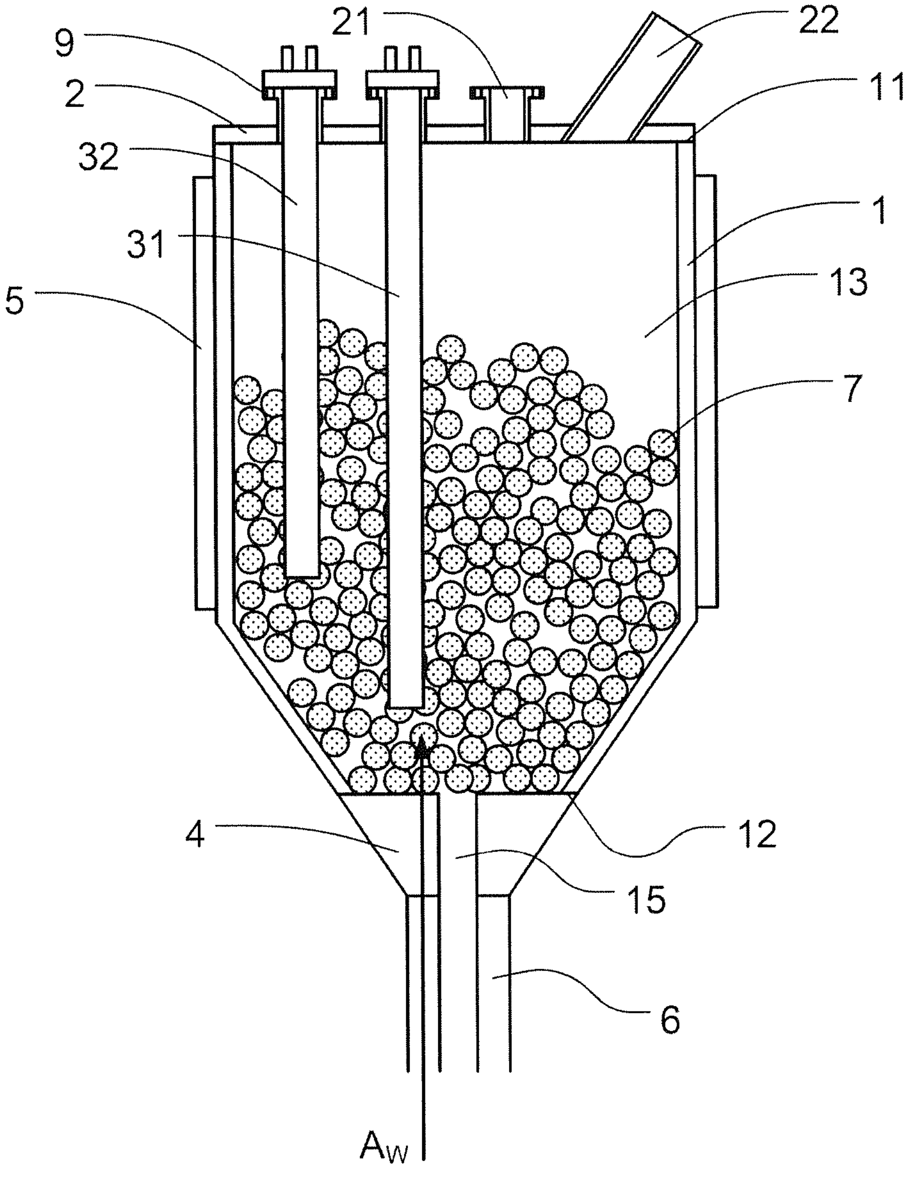
FIG. 2 shows an inner structural schematic diagram during operation according to the present invention.

First, please refer to FIG. 1 and FIG. 2, which show structural schematic diagrams according to the present invention. As shown in the figures, the structure of the hybrid heating apparatus comprises a tank 1, a top opening part 11, a bottom opening part 12, a lid 2, a plurality of holes 21, at least an inner heating unit 3, a gas distributor 4, and an outer heating unit 5. The top and bottom opening parts 11, 12 are located on the top and bottom ends of the tank 1. Lid 2 is disposed on the top opening part 11. The plurality of holes 21 are disposed on the surface of the lid 2. In addition, the plurality of holes 21 have flanges 9, respectively, used as the connecting members with the inner heating unit 3.

Additionally, the inner heating units 3 insert into the plurality of holes 21, respectively and enter downwards toward the inside of tank 1. The gas distributor 4 is disposed at the bottom opening part 12 of tank 1. The outer heating unit 5 surrounds and covers the outer sidewall of tank 1. The technical feature of the present invention is to combine multiple heat sources for achieving the purpose of hybrid heating, and target to be heated by those various types of heat sources is placed in tank 1.

Please refer again to FIGS. 1 and 2. There is a storage space 13 in tank 1 used for accommodating the materials to be heated. The storage space 13 is formed by the sidewall and the bottom structure of the tank 1. Here, the materials to be heated are filters, which can be silica sand ($SiO_2$). These filter granules 7 are introduced into the storage space 13 via the filters inlet 22 on the lid 2 for heating.

As storage space 13 is filled with a substantial amount of the filter granules 7 and heating is about to be performed, one of the heating sources heats by an electric heating apparatus and in the form of heat conduction. As shown in FIG. 1, the top opening part 11 of tank 1 is covered by lid 2, which seals storage space 13 from the top direction. Nonetheless, holes 21 are located on the surface of lid 2 so that the bar-shaped inner heating units 3 can insert through holes 21, follow the direction guided by holes 21, go down deep into storage space 13, and then insert into filter granules 7 directly for transferring thermal energy by contacting them directly.

The conduction thermal resistance $R_{cd}$ among filter granules 7 can be reduced effectively by distributing the electric heating bars. In addition, because multiple holes 21 can be disposed freely on the surface of lid 2, users can decide the number of inserted inner heating units 3 and their distribution according to the requirements for adjusting and controlling the supply of thermal energy at will. Moreover, in addition to the flexibility in the distribution of inner heating units 3, the diameters of holes 21 can be varied as well. For example, the use of holes 21 having different diameters enables distributed usage of the inner heating unit 3 with different specifications. If there is any hole 21 having the flange 9 not inserted by the inner heating unit 3, a blind flange 91 can be disposed for keeping its sealed. Alternatively, devices such as a temperature measuring unit 33 can be inserted here according to the requirements for monitoring, and thus endow holes 21 with multiple functions.

The length of inner heating unit 3 can also be adjusted according to the shape of storage space 13. That is to say, a long heating unit 31 is selected for the deeper location in storage space 13; otherwise, a short heating unit 32 is adopted. By using this method of opening holes 21 on lid 2 and inserting inner heating units 3 for direct-contact heating, the heating uniformity can be ensured quite easily.

In addition to inserting inner heating units 3, another heat source according to the present invention comes from the periphery of tank 1. As shown in FIG. 1, the outer sidewall of tank 1 is surrounded and covered by outer heating unit 5, which is composed by at least an electric heating plate. Opposed to inner heating unit 3, outer heating unit 5 transfers thermal energy from outside of tank 1 to the inside. In addition to transferring thermal energy, the outer heating unit 5 also has the effect of the keeping constant temperature, and reducing the possibility of losing thermal energy from the inside of tank 1 by way of the sidewall and to the outside.

In short, the technical characteristics of the disposition and distribution of the inner and outer heating units for providing direct-contact heating as described above is on improving the uniformity of the distribution of the supplied thermal energy and reducing the temperature variation in various regions in the storage space 13.

Regarding the ratio of heat supply using the electric heater according to the present invention, inner heating unit 3 is the main supplier and provides a larger proportion of thermal energy, around 70~90% of thermal energy. The outer heating unit 5 is the supplementary supplier and supplying around 10~30% of thermal energy. It is because in addition to supplying heat into tank 1, outer heating unit 5 is still possible to dissipate thermal energy outwards. Thereby, the inner heating unit 3 is the main source of direct-contact heating due to the consideration of saving energy source.

While using the electric heater to heat by direct contact uniformly, according to the present invention, hot exhaust gas $A_w$ is further used for forced convection in order to reduce the convection thermal resistance $R_{cv}$ and enhance the heating effect. In other words, external force, such as fans or pumps, is used for pushing and driving high-temperature gas to flow into the tank.

In the present invention, the high-temperature exhaust gas $A_w$ used for heating is led in from the bottom of storage space 13 in tank 1. The hot exhaust gas $A_w$ can be the exhaust gas generated by other apparatuses or system. Therefore, it is not required to consume extra resources such as burning fuel for providing the high-temperature gas. Instead, the exhaust gas once to be emitted directly to the atmosphere is recycled now through injected upwards from the bottom of storage space 13. When hot exhaust gas $A_w$ flows upwards and passes the gaps among filter granules 7, the heat convection coefficient h is increased by the flowing gas, which reduces the convection thermal resistance $R_{cv}$ and enhances the distribution uniformity of heat.

As described above, the contact area of the interfaces between filter granules 7 is quite small and resulting in the problem of impedance in thermal conduction. Regarding the method for reducing the thermal resistance, the present invention uses the forced convection of the hot exhaust gas $A_w$ to fill into the gaps among filter granules 7. Thus, the static gas in the gaps is pushed to move, which reduces the convection thermal resistance $R_{cv}$ and enhances the efficiency of heat transfer.

The diameter of exhaust pipe 6 is normally smaller than the width of the tank 1 and limits the beneficial result of hot exhaust gas $A_w$. In order to bring the gas flow and thermal energy into storage space 13 uniformly, the gas distributor 4 is disposed at the bottom opening part 12 of the tank 1 according to the present invention. The gas distributor 4 has a plurality of gas outlets 41 and hence guiding the heating gas upwards, namely, guiding the hot exhaust gas $A_w$ to storage space 13.

Figure 3A:
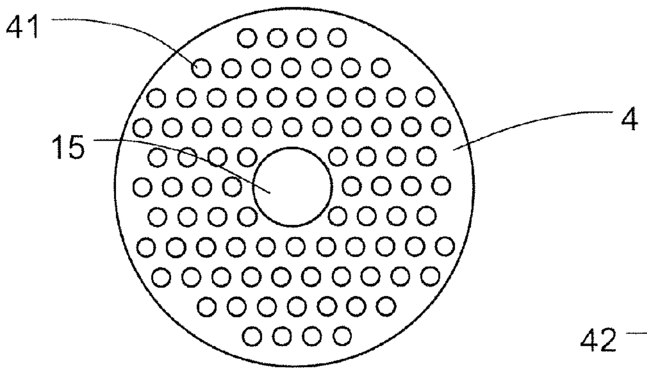
FIG. 3A shows a top view of the gas outlets of the gas distributor according to the present invention.
Figure 3B:
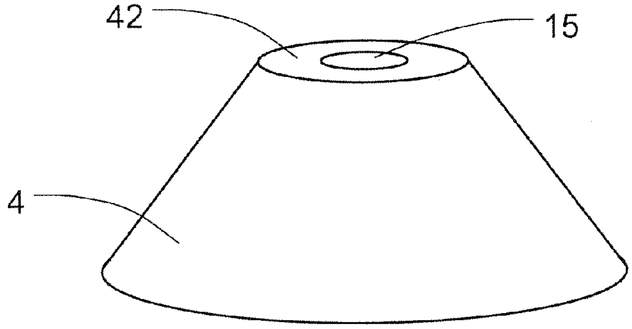
FIG. 3B shows a schematic diagram of the gas inlet zone of the gas distributor according to the present invention.

The purpose of gas distributor 4 is to diffuse the gas uniformly and let the gas flow into tank 1 in a large-area fashion. The structure of gas distributor 4 is full of variety instead of limited to a single specification. The top view shown in FIG. 3A and FIG. 3B show a simpler form of gas distributor 4. Gas outlets 41 and gas inlet zone 42 are disposed on the top and bottom surfaces of gas distributor 4, respectively. At a center part, there is a filter outlet 15 allowing the heated filters to exit. The preferred disposition inside gas distributor 4 is diffusing the hot exhaust gas $A_w$ directly, which means after the hot exhaust gas $A_w$ enters the gas inlet zone 42, it exits from gas outlets 41 dispersively and enters storage space 13 uniformly for heating filter granules 7 and reducing the thermal resistance.

According to the present invention, gas distributor 4 with a specific vent or aperture ratio can be used according to the materials to be heated or other requirements. Besides, the bore diameter of gas distributor 4 can be selected according to the size of the materials as well. Take heating the silica sand for example. The diameter of the gas outlets 41 of the adopted gas distributor 4 is 2 mm, which is smaller than the diameters of the granules of the silica sand. Therefore, the silica sand will not fall into the gas outlets 41.

Figure 4:
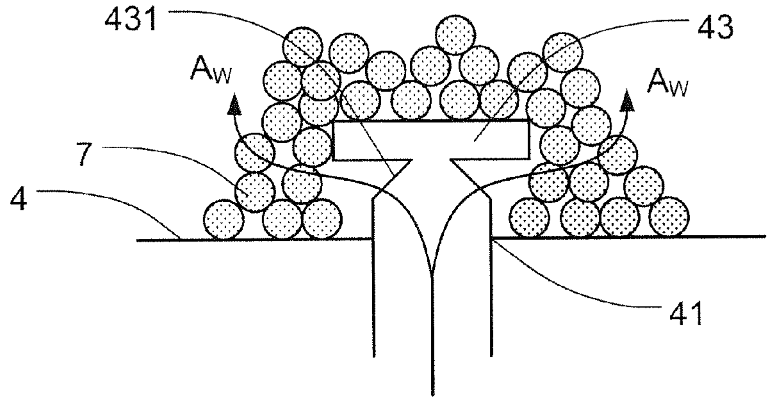
FIG. 4 shows a schematic diagram of the blocking plate of the gas distributor according to the present invention.

Furthermore, as shown in FIG. 4, gas outlets having a blocking-plate structure 43 can be selected as well. Then, even if the diameters of filter granules 7 are smaller than the diameter of gas outlets 41, under the protection of the blocking-plate structure 43, filter granules 7 will not fall into gas outlets 41 easily. In addition, by the guidance of opening 431 of blocking-plate structure 43, the hot exhaust gas $A_w$ will be guided with more flexibility.

In addition to the above form of gas distributor 4, it can be further designed to combine with the structure of tank 1. In other words, the structure of gas distributor 4 is further extended into tank 1, so that it is embedded inside tank 1 and attaches closely to the inner sidewall of tank 1. Then, in addition to entering storage space 13 upwards from bottom via a substantial amount of gas outlets 41 on the surface of gas distributor 4, hot exhaust gas $A_w$ also enters storage space 13 from the side. Therefore, the effect of forced convection of the hot exhaust gas $A_w$ is reinforced.

Figure 5A:
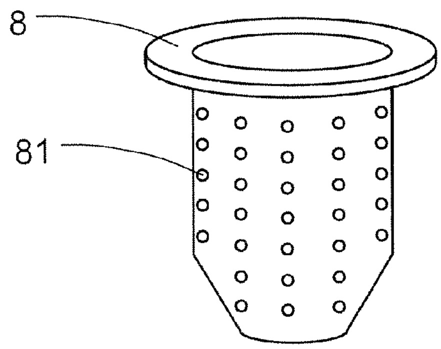
FIG. 5A shows a structural schematic diagram of the lining sheath according to the present invention.
Figure 5B:
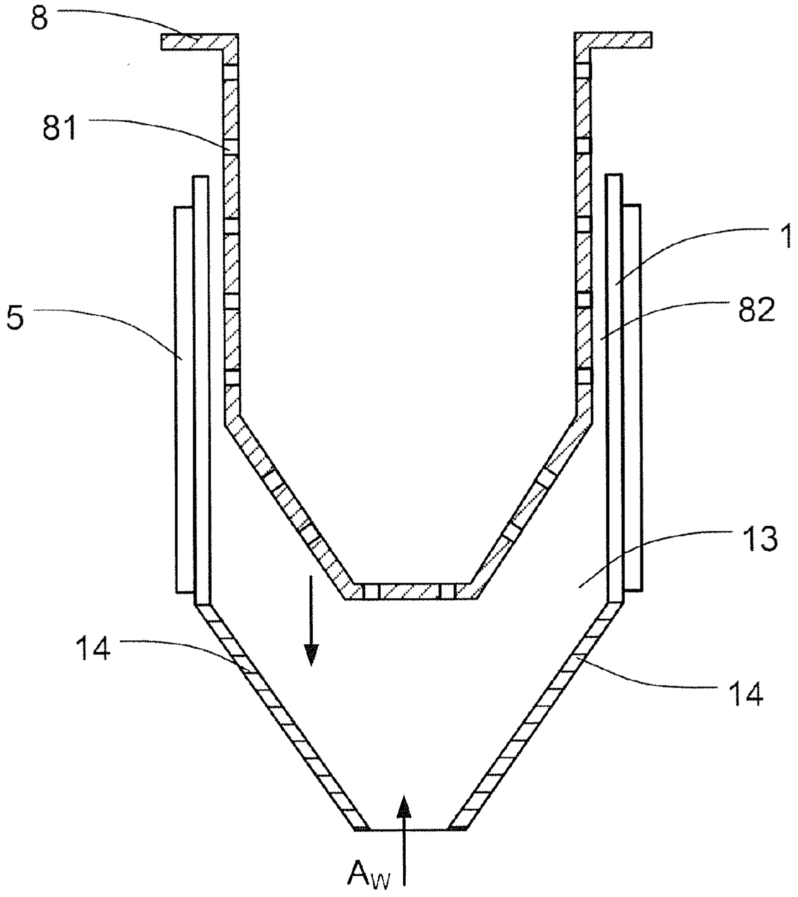
FIG. 5B shows a structural schematic diagram of installing the lining sheath according to the present invention.
Figure 6:
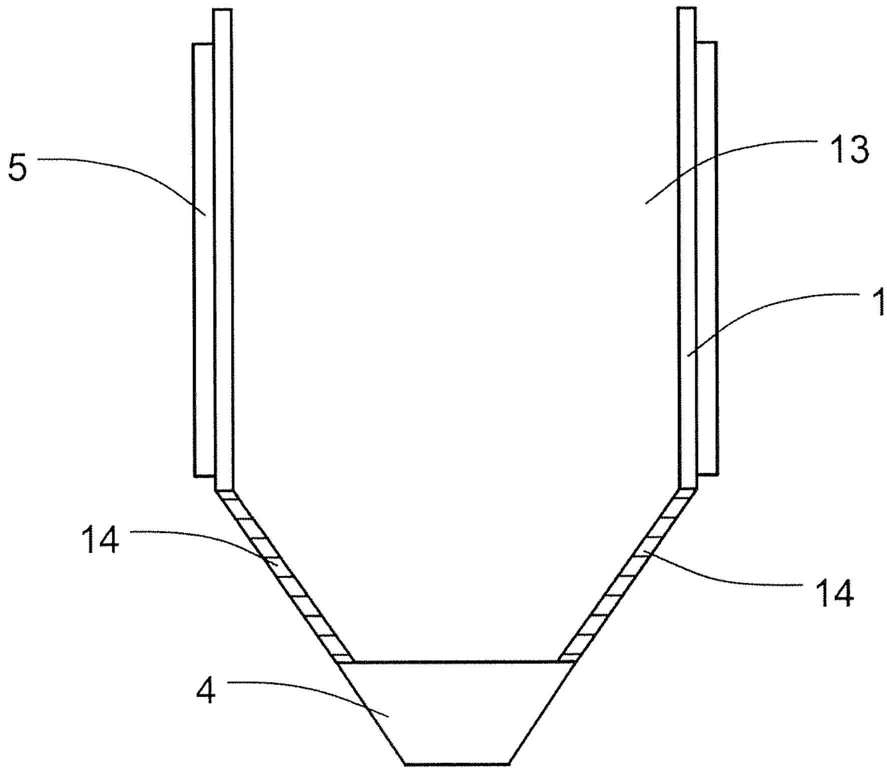
FIG. 6 shows a schematic diagram of the location of the hollow layer according to the present invention.

Please refer to FIGS. 5A and 5B, which show another type of the gas distributor 4 for improving the thermal efficiency. A lining sheath 8 is further disposed in tank 1. The shape of lining sheath 8 complies with storage space 13. After the top of lining sheath 8 contacts the inner sidewall of tank 1, a lining space 82 is formed between lining sheath 8 and tank 1. Besides, by removing gas distributor 4, hot exhaust gas $A_w$ can enter storage space 13, namely, lining space 82, directly. After flowing upper by way of a plurality of gas injecting holes 81 on lining sheath 8, hot exhaust gas $A_w$ exits by injection so that hot exhaust gas $A_w$ can flow from the edge close to the side of storage space 13 toward the center and thus fill the gaps among the interfaces of filter granules 7 more firmly. Moreover, for the portion of tank 1 does not cover by outer heating unit 5, as shown in FIG. 6, a portion of the sidewall of tanks 1 is a hollow layer 14, which means thermal insulation can be achieved by vacuum. Thereby, the thermal energy can be stored in storage space 13.

By using the structure design as described above, the hybrid heating apparatus according to the present invention combines various types of heat sources successfully for heating the materials in the storage space concurrently and ensures the materials can acquire uniform thermal energy. In addition, the heat supply of the heat sources can be controlled easily; for example, by adjusting the length of the inserted inner heating unit and the flow rate of the hot exhaust gas. The present invention also promotes the concept of environmental protection. It recycles the exhaust heat generated by other apparatuses or systems directly by guiding and reduces the costs of energy consumption for the heating apparatus. In conclusion, having the advantages of considering thermal efficiency, heating uniformity, environmental protection, and power saving, the present invention undoubtedly provides a hybrid heating apparatus having economical and practical values.

Accordingly, the present invention conforms to the legal requirements owing to its novelty, nonobviousness, and utility. However, the foregoing description is only an embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A hybrid heating apparatus, comprising:
- a tank, having a storage space inside, and having a top opening part and a bottom opening part on the top and bottom ends;
- a lid, disposed on said top opening part, and having a plurality of holes on the surface;
- at least an inner heating unit, inserting to said plurality of holes and downwards into said storage space; and
- a gas distributor, disposed at said bottom opening part, and having a plurality of gas outlets for leading a heating gas upwards and into said storage space;
- wherein said gas distributor has said plurality of gas outlets on a top surface and at least a gas inlet zone on a bottom surface, and an end of said gas distributor connects with an exhaust gas pipe;
- wherein said gas distributor extends and attaches to an inner sidewall of said tank so that said heating gas is led into said storage space from the side of said tank via said plurality of gas outlets.

2. The hybrid heating apparatus of claim 1, wherein said inner heating unit is a long electric heating bar.

3. The hybrid heating apparatus of claim 1, further comprising an outer heating unit surrounding and covering the outer sidewall of said tank.

4. The hybrid heating apparatus of claim 3, wherein said outer heating unit is formed by at least an electric heating plate.

5. The hybrid heating apparatus of claim 3, wherein said thermal energy provided by said plurality of inner heating units is greater than said thermal energy provided by said outer heating unit.

6. The hybrid heating apparatus of claim 1, wherein said plurality of gas outlets have a blocking-plate structure.

7. The hybrid heating apparatus of claim 1, further comprising a lining sheath, disposed in said tank, and removing said gas distributor for enabling said heating gas to enter said storage space directly.

8. The hybrid heating apparatus of claim 7, further comprising a lining space is formed between said lining sheath and the inner sidewall of said tank.

9. The hybrid heating apparatus of claim 1, wherein a portion of a sidewall of said tanks is a hollow layer.

10. The hybrid heating apparatus of claim 1, wherein the diameters of said plurality of gas outlets are smaller than the diameters of a plurality of filter granules in said storage space.

11. A hybrid heating apparatus, comprising:
- a tank, having a storage space inside, and having a top opening part and a bottom opening part on the top and bottom ends;
- a lid, disposed on said top opening part, and having a plurality of holes on the surface;
- at least an inner heating unit, inserting to said plurality of holes and downwards into said storage space;
- a gas distributor, disposed at said bottom opening part, and having a plurality of gas outlets for leading a heating gas upwards and into said storage space;
- a lining sheath, disposed in said tank, and removing said gas distributor for enabling said heating gas to enter said storage space directly; and
- a lining space is formed between said lining sheath and an inner sidewall of said tank; wherein said heating gas first passes said lining space, and then enters said storage space via a plurality of injecting holes of said lining sheath.

* * * * *